United States Patent [19]
Loui et al.

[11] Patent Number: 5,764,277
[45] Date of Patent: Jun. 9, 1998

[54] GROUP-OF-BLOCK BASED VIDEO SIGNAL COMBINING FOR MULTIPOINT CONTINUOUS PRESENCE VIDEO CONFERENCING

[75] Inventors: Alexander C. P. Loui, Freehold; Ming-Ting Sun, Holmdel, both of N.J.; Ting-Chung Chen, San Jose, Calif.

[73] Assignee: Bell Communications Research, Inc., Morristown, N.J.

[21] Appl. No.: 555,370

[22] Filed: Nov. 8, 1995

[51] Int. Cl.[6] ........................................... H04N 7/14
[52] U.S. Cl. ........................ 348/14; 348/15; 348/16; 348/17
[58] Field of Search ........................ 348/14–17, 578, 348/588, 584, 553, 426, 390, 385, 387

[56] References Cited

U.S. PATENT DOCUMENTS

| | | | |
|---|---|---|---|
| 5,453,780 | 9/1995 | Chen et al. | 348/15 |
| 5,568,184 | 10/1996 | Shibata et al. | 348/15 |
| 5,604,738 | 2/1997 | Shibata et al. | 348/15 |

OTHER PUBLICATIONS

"Video Bridging Based on H.261 Standard," Shaw–Min Lei, Ting–Chung Chen, Ming–Ting Sun, IEEE Transactions on Circuits and Systems for Video Technology, vol. 4, No. 4, pp. 425–431, Aug. 1994.

"Draft Revised Recommendation H.261—Video Codec for Audiovisual Services at p×64 kbit/s," CCITT Study Group XV –Report R 95, May 1992.

"Draft new Recommendation H.231—Multipoint control units for audiovisual systems using digital channels up to 2 Mbit/s," CCITT Study Group XV –Report R 93, May 1992.

"ITU–T Recommendation H.263," International Telecommunication Union, Study Group 15, Nov. 1995.

"Draft revised Recommendation H.242—System for establishing communication between audio visual terminal using digital channels up to 2 Mbit/s," CCITT Study Group XV, Report 94, May 1992.

"Draft new Recommendation H.243—Procedures for establishing communication between three or more audiovisual terminals using digital channels up to 2 Mbit/s," CCITT Study Group XV, Report R 94, May 1992.

"Video Combining for Multipatent Videoconferencing." A. Loui and M.T. Sun IS&T's 48th Annual Conference Proceedings, The Society for Imaging Science and Technology, pp. 48–50, May 1995.

*Primary Examiner*—Victor R. Kostak
*Attorney, Agent, or Firm*—Joseph Giordano; Loria B. Yeadon; David A. Hey

[57] ABSTRACT

An apparatus and method for combining video signals from multiple users in a continuous presence video conferencing system. Video signals are received from each of a number of different system users. The signals include input frames each having a number of different groups-of-blocks (GOBs). The GOBs correspond to hierarchically organized video data and header information. The input frame GOBs are used to form a composite output video signal suitable for transmission to each of the system users. An output frame of the composite output signal incorporates at least one of the GOBs from the input frames of each of the users and less than all of the GOBs from the input frame of at least one of the users. The resulting output video signal provides flexible continuous presence video conferencing in which video signals from multiple users may be simultaneously displayed to all users in a selected divided-screen format. The input frames may be Quarter Common Intermediate Format (QCIF) frames and the output frames may be Common Intermediate Format (CIF) frames in accordance with the H.261 video coding standard.

20 Claims, 6 Drawing Sheets

FIG. 2
(PRIOR ART)
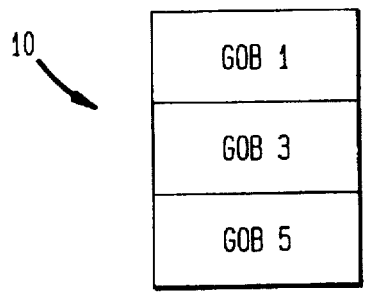
FIG. 3
(PRIOR ART)
FIG. 4
(PRIOR ART)
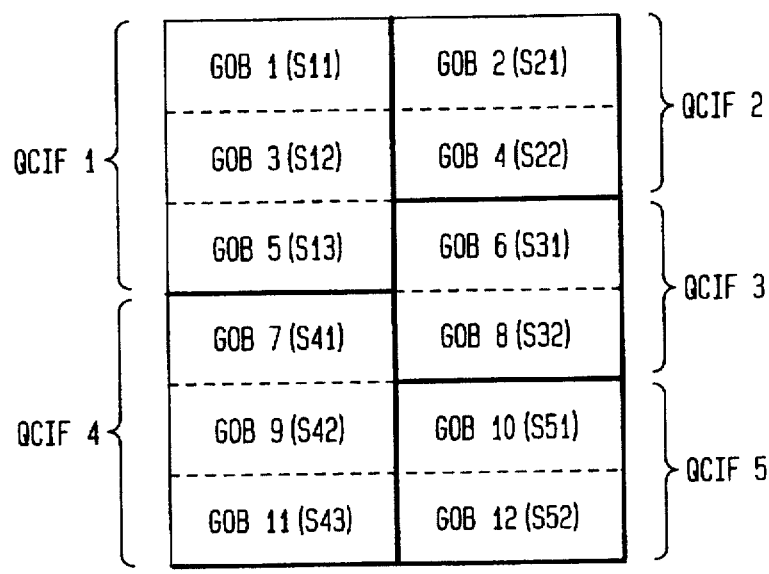

GROUP-OF-BLOCK BASED VIDEO SIGNAL COMBINING FOR MULTIPOINT CONTINUOUS PRESENCE VIDEO CONFERENCING

FIELD OF THE INVENTION

The present invention relates generally to digital video signal processing, and more particularly to the combining of coded video frames from multiple users into a combined frame suitable for providing a composite video signal in a multipoint continuous presence video conferencing system.

BACKGROUND OF THE INVENTION

A multipoint video conferencing system generally includes a multipoint control unit (MCU) which receives video signals from several different users and provides a single output video signal which can be simultaneously displayed to all users. The video signals are typically received and transmitted in a coded and compressed digital format. Multipoint video conferencing can be of, for example, the "switched presence" type or the "continuous presence" type. One known switched presence MCU permits selection of the video signal from one user for transmission to all users. The particular user whose video signal is transmitted to all others may be selected by a designated conference "chairman" or may be based on which user is presently speaking as determined by monitoring audio channel activity. Switched presence MCUs generally do not require processing of video signals to generate a composite signal and are therefore relatively simple to implement. Additional details regarding switched presence video conferencing can be found in Draft Recommendation H.231, "Multipoint control units for audiovisual systems using digital channels up to 2 Mbit/s," CCITT Study Group XV, Report R 93, pp. 11–22, May 1992, and Draft Recommendation H.243, "Procedures for establishing communication between three or more audiovisual terminals using digital channels up to 2 Mbit/s," CCITT Study Group XV, Report R 94, May 1992, both of which are incorporated by reference herein.

Continuous presence video conferencing generally involves processing the input video signals from the system users to generate an output composite video signal. The composite video signal may provide each user with, for example, a partitioned display screen having separate portions corresponding to the video signals of the individual users. Each user in a continuous presence conference can then see one or more of the other users in real time. A continuous presence conference therefore more closely emulates an actual in-person conference than a switched presence conference. Exemplary continuous presence video conferencing systems are disclosed in U.S. Pat. No. 5,453,780, which is assigned to the assignee of the present invention, and in S. Lei et al., "Video Bridging Based on H.261 Standard," IEEE Transactions on Circuits and Systems for Video Technology, Vol. 4, No. 4, pp. 425–436, August 1994, both of which are incorporated by reference herein.

There are at least two known approaches to combining video signals in continuous presence systems. One approach is referred to as pel-domain video mixing or more simply "transcoding." The other approach is referred to as coded-domain video combining. Transcoding involves fully decoding each input video signal down to the pel domain, combining the decoded signals in the pel domain to form an uncoded composite video signal, and then encoding the composite signal to provide an output composite video signal. Although transcoding provides flexibility in combining video signals having different picture formats, sizes and coding standards, it also has a number of disadvantages including additional throughput signal delay, substantially increased hardware complexity in the MCU, and possible picture quality degradation.

The coded-domain video combining approach involves combining the video signals without decoding the compressed video data streams down to the pel domain. This approach has the advantage of shorter throughput signal delay, reduced complexity and better picture quality. The above-cited U.S. Pat. No. 5,453,780 discloses a coded-domain video combining technique illustrated using the H.261 CCITT standard for video coding and decoding as described in Draft Revised Recommendation H.261, "Video Codec for Audiovisual Services at p×64 kbit/s," CCITT Study Group XV, Report R 95, May 1992, which is incorporated by reference herein.

FIG. 1 shows a syntax diagram of the top two layers of the H.261 four-layer hierarchical video multiplex structure. The four layers in the H.261 standard are the picture layer, the group-of-block (GOB) layer, the macroblock (MB) layer and the block layer. The picture layer shown in FIG. 1 is the highest-level layer and indicates that a video signal encoded in accordance with the H.261 standard is composed of a plurality of "pictures" or video frames. Each video frame includes a picture start code (PSC) followed by a temporal reference number (TR) that indicates a frame sequence number for the corresponding frame. These are followed by picture type information (PTYPE), which indicates, among other things, the format of the corresponding frame. The PTYPE field is followed by extra insertion information (PEI) and spare information (PSPARE) which are further described in the above-cited H.261 reference. The PSC, TR, PTYPE, PEI and PSPARE fields are part of a picture header. The remainder of the frame at the picture level includes a number of groups-of-blocks (GOBs) of data. The GOB layer shown in FIG. 1 indicates that each GOB starts with a header including a group-of-block start code (GBSC) and a group number (GN). The GOB header also includes quantization step size information (GQUANT), extra insertion information (GEI) and spare information (GSPARE) which are further described in the above-cited H.261 reference. Each GOB then includes a number of macroblocks configured in accordance with the MB layer of the H.261 standard.

FIGS. 2 and 3 illustrate two frame formats supported by the H.261 standard. The H.261 standard provides for the transmission of coded video in either a Quarter Common Intermediate Format (QCIF) consisting of 176 horizontal pels×144 scan lines, or in a Common Intermediate Format (CIF) consisting of 352 horizontal pels×288 scan lines. FIG. 2 shows a typical QCIF frame 10 including three GOBs, numbered GOB 1, GOB 3 and GOB 5. Each GOB in a QCIF frame includes eleven horizontal by three vertical macroblocks of pel data, with each macroblock including four luminance blocks Y and two color difference blocks $C_B$ and $C_R$. Each block consists of an 8×8 arrangement of pels. FIG. 3 shows a typical CIF frame 20 which includes twelve GOBs labeled GOB 1 through GOB 12.

A video combining technique disclosed in the above-cited U.S. Pat. No. 5,453,780 combines four QCIF video data streams from four different video-conference participants or users into a single CIF video data stream. For example, GOBs 1, 3 and 5 in the QCIF frame 10 of FIG. 2 can be sequentially inputted from each of the four QCIF inputs and renumbered with CIF GOB numbers 1–12 as shown in FIG.

3. The resulting combined coded video signal is then transmitted back to all the users such that each user can simultaneously view four users on a 2×2 divided-screen display. Since the four QCIF inputs are likely to have different pictorial complexities as well as unequal frame rates, the inputs often cannot simply be combined in accordance with a predetermined input order if the resulting composite output signal is to remain in frame synchronization. U.S. Pat. No. 5,453,780 therefore provides techniques which facilitate QCIF to CIF combination in the presence of length variations between GOBs in the QCIF input streams. The variable lengths of the GOBs result from, for example, the differing pictorial complexities of each input as well as the variable-length encoding of the input video signals from frame-to-frame and from input-to-input.

Although the coded-domain video combining techniques of U.S. Pat. No. 5,453,780 provide significant advantages in combining four QCIF inputs into a single CIF output, the techniques provide simultaneous display for a maximum of four participants, each of whom equally share a 2×2 divided-screen display. This unduly restricts the flexibility of the video conferencing system and limits its use in certain applications such as, for example, those with more than four users or those in which it is desirable to allocate one user a larger portion of the display than another user.

As is apparent from the above, a need exists for an improved coded-domain video combining technique which is capable of accommodating simultaneous display of more than four system users and allowing unequal divisions of the resulting display among different users.

SUMMARY OF THE INVENTION

The present invention provides a method and apparatus for coded-domain combining of video signals from multiple video conference users into a combined video signal suitable for transmission to all of the users. In one embodiment, the combining arranges groups-of-blocks (GOBs) from each of a plurality of incoming QCIF video signals into an output CIF video signal. All of the GOBs from QCIF input frames of certain users are included in the output video signal, while one or more of the GOBs for other users are dropped.

In accordance with one aspect of the invention, an input frame of a video signal is received from each of a plurality of system users. Each of the input frames includes a number of GOBs. A composite frame is formed and includes at least one of the GOBs from the input frame of each of the plurality of users and less than all of the GOBs from the input frame of at least one of the users. In a system in which it is desirable to provide a divided-screen simultaneous display of five users, a CIF output frame could be formed using all the GOBs from input QCIF frames of two of the users and two GOBs from QCIF frames of each of the remaining users. For a simultaneous divided-screen display of twelve users, a CIF output frame could be formed using one GOB from an input QCIF frame of each of the twelve users. Of course, numerous other arrangements of input GOBs are possible depending upon the number of users and the desired output display.

Another aspect of the invention involves the identification of input GOBs and combination of the input GOBs into a suitable output frame. These operations may be performed by first identifying a picture start code (PSC) and a temporal reference number (TR) in each of the QCIF input frames. The TR for each of the input frames is then mapped onto a scale of predetermined possible TRs common to a plurality of the input frames. A GOB start code (GBSC) and group number (GN) is then detected for each of the GOBs of each of the input frames. If a given QCIF input frame is to be incorporated into the output frame as a first output frame GOB, its header is modified to correspond to a CIF output frame header. The group numbers for at least one of the GOBs of each input frame are then mapped to output frame group numbers. The input frame GOBs are then incorporated into the output frame in accordance with the predetermined group number mapping. Any input GOBs not incorporated into the current output frame are skipped such that the selected input GOBs incorporated into the next output frame will appear in the proper screen location when displayed.

The present invention provides a number of advantages over other known continuous presence video signal combining techniques. For example, the present invention can combine video signals from more than four users into a composite video signal suitable for simultaneous divided-screen display. The portion of the display allocated to particular users can also be adjusted, such that more important or active users may be allocated a larger portion of the continuous presence display relative to other users. These and other advantages and features of the present invention will become more apparent from the accompanying drawings and the following detailed description.

BRIEF DESCRIPTION OF THE DRAWINGS

FIG. 2 shows the three GOBs of a conventional QCIF frame.

FIG. 3 shows the twelve GOBs of a conventional CIF frame.

FIG. 4 shows a combined frame in accordance with the present invention.

DETAILED DESCRIPTION OF THE PREFERRED EMBODIMENT

The present invention will be illustrated below using an exemplary group-of-block (GOB) data structure in accordance with the H.261 video coding standard. It should be understood, however, that the invention is more broadly applicable to other block-based coding techniques. The term "group-of-block" as used herein is therefore intended to include any suitable arrangement of a plurality of data blocks within a frame. For example, a GOB may represent the smallest coding unit block which can be isolated and processed without resort to entropy decoding or other computation-intensive statistical decoding techniques. In H.261 applications, an isolated GOB or an isolated group of GOBs can be readily achieved by constraining the encoder motion search area to the corresponding GOB(s). Furthermore, the invention could be applied to data blocks which include not only video data but also audio and other types of non-video data. The term "video signal" as used herein is therefore intended to include these and other alternative block-based data streams.

FIG. 4 illustrates an exemplary composite video output frame 30 in accordance with the present invention. The output frame 30 corresponds to a CIF frame and includes twelve GOBs. The twelve output frame GOBs have been selected to include one or more GOBs from five different QCIF input video signals provided by five different video conference participants, also referred to herein as users. The input GOBs have been relabeled in accordance with their respective positions in the CIF output frame 30. The notation Sij. ($1 \leq i \leq 5$, $1 \leq j \leq 3$) used in FIG. 4 designates the size of the jth coded GOB within a given QCIF input frame from a participant i. A first video input QCIF 1 has its three GOBs inserted into positions GOB 1, GOB 3 and GOB 5 of the output frame 30. A second video input QCIF 2 has two of its three GOBs inserted into positions GOB 2 and GOB 4 of output frame 30. A third video input QCIF 3 has two of its three GOBs inserted into positions GOB 6 and GOB 8 of output frame 30. A fourth video input QCIF 4 has its three GOBs inserted into positions GOB 7, GOB 9 and GOB 11 of output frame 30. Finally, a fifth video input QCIF 5 has two of its GOBs inserted into positions GOB 10 and GOB 12 of frame 30. The present invention thus combines incoming video frames from a plurality of video conference participants to provide a combined output frame suitable for transmission to all participants. Although illustrated in conjunction with a system having five participants, the exemplary output frame 30 can accommodate at least one input GOB from up to twelve participants.

Figure 5:
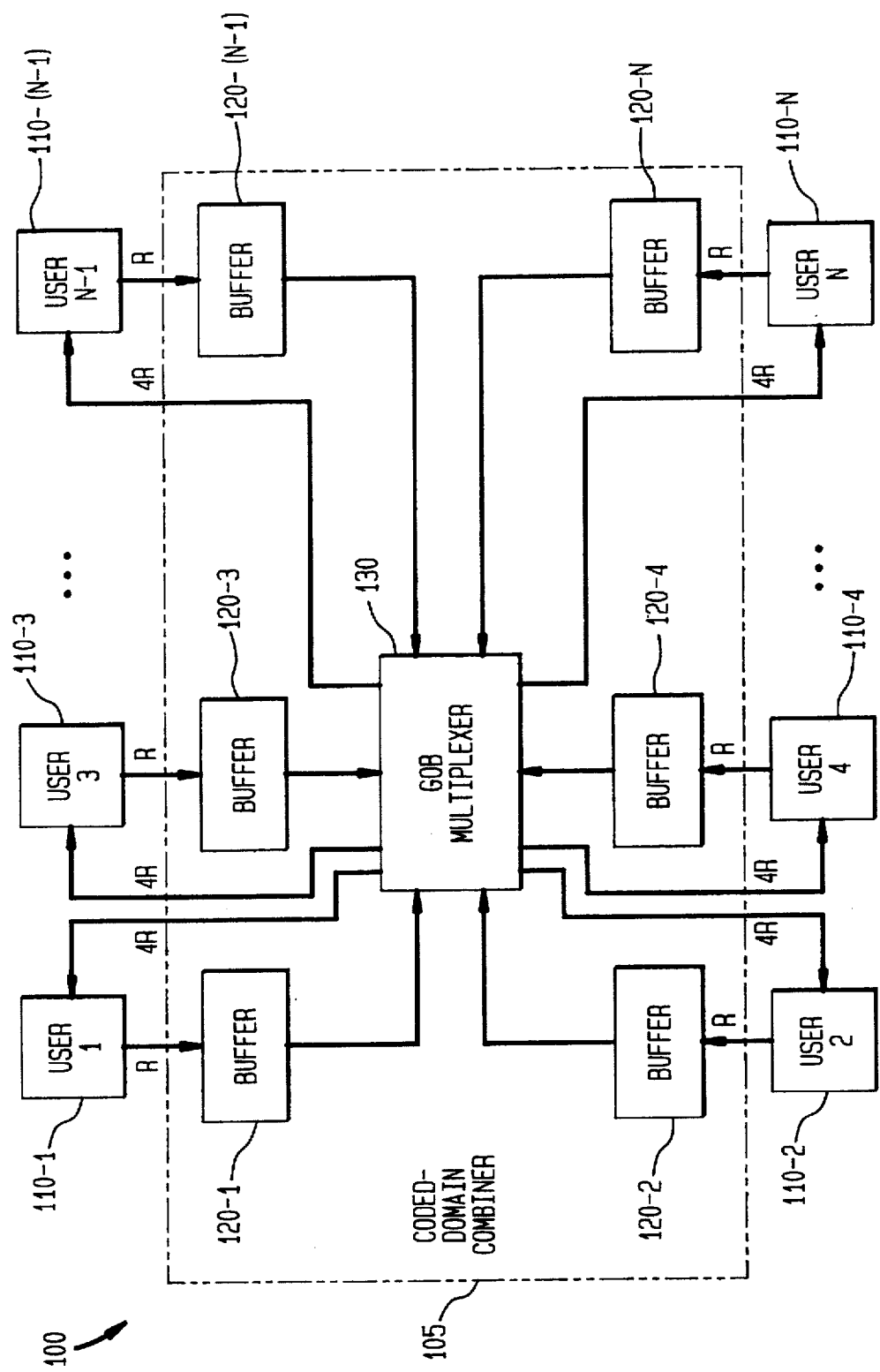
FIG. 5 is a block diagram of a video conferencing system including an exemplary GOB-based video signal combiner in accordance with the present invention.

FIG. 5 shows an exemplary video conferencing system 100 which includes a GOB-based coded-domain video signal combiner 105 in accordance with the present invention. A plurality N of video conference system users 110-i.i=1, 2 ... N (where $N \leq 12$ in this example), transmit video signals to corresponding buffers 120-i in the combiner 105. The users 110-i transmit coded digital video signals at a data rate R via conventional codecs (not shown). The buffers 120-i store one or more of the incoming video frames from each of the users until the GOBs thereof are needed for insertion into an output frame in the manner previously described in conjunction with FIG. 4. The buffers 120-i also serve to accommodate variable-length coded GOBs as described in greater detail in the above-cited U.S. Pat. No. 5,453,780. The buffers 120-i supply the corresponding video signals to a GOB multiplexer 130 which processes the incoming signals to provide an output video signal including combined output frames such as frame 30 of FIG. 4. Multiplexer 130 is operative to identify the GOBs in the incoming video streams from each of the N users 110-i and to multiplex the incoming GOBs into a single output CIF video stream. The multiplexer 130 may be implemented as a computer, microprocessor, ASIC or other suitably-programmable digital data processor. Multiplexer 130 transmits an output video signal 130 to each of the users 110-i at a data rate of 4R such that each user receives a composite video signal which includes GOBs from one or more of the other users. As noted above, in embodiments of the present invention which combine QCIF inputs into a CIF output, up to twelve input video signals may be multiplexed into a single CIF output stream.

Figure 6:
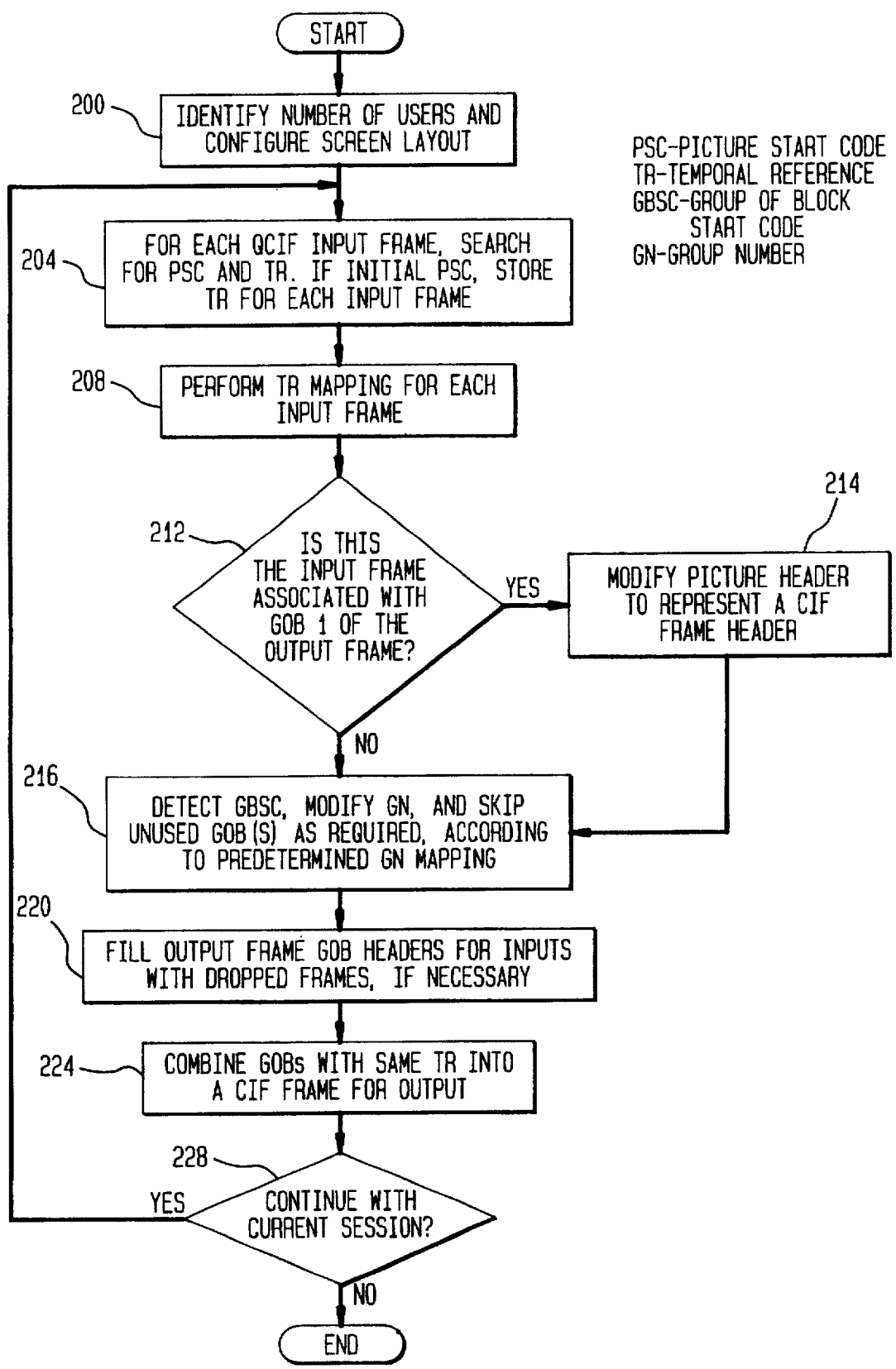
FIG. 6 is flow chart illustrating an exemplary method of combining user frames in accordance with the invention.

FIG. 6 is a flow diagram illustrating an exemplary set of operations in a continuous presence video conferencing system using the coded domain video signal combiner 105 of FIG. 5. Operation block 200 indicates that during initial conference set-up the number of users and the desired screen layout are determined. The present invention allows considerable flexibility in terms of number of users and screen layout. As noted above, the invention may combine up to twelve QCIF user inputs in real time by incorporating one GOB from each QCIF input into a CIF output frame. Also, a greater amount of screen space may be allocated to the most important or active users by including more of the GOBs from those users in the combined output frame. For example, a video display screen could be partitioned in accordance with the relative number of GOBs which each of the users contributes to the output frame. In a five-user system with an output frame as shown in FIG. 4, a corresponding display screen could be partitioned in the same manner in which frame 30 is partitioned by solid lines. Thus, a left half of the screen could be divided equally between users 110-1 and 110-4, and a right half of the screen could be divided equally between the three remaining users. It will be readily apparent that numerous alternative combinations of users and variations in screen layout are possible using the present invention. The number of users and desired screen layout may be selected by one or more users entering predetermined commands in accordance with conventional conference set-up techniques.

After the number of users and the screen layout are determined, the multiplexer 130 of FIG. 5 searches each QCIF input frame from each user for a picture start code (PSC) and a temporal reference number (TR) as shown in operation block 204. If the resultant PSC is determined to be an initial PSC, the multiplexer 130 stores the TR for each of the input QCIF frames. The multiplexer 130 then performs a TR mapping operation for each of the input frames. The TR mapping generally provides a suitable time synchronization between the different QCIF inputs. Exemplary TR mapping techniques suitable for use with the present invention are described in detail in the above-cited U.S. Pat. No. 5,453,780.

A decision is then made in decision block 212 as to whether a given input QCIF frame is to provide GOB 1 of the output CIF frame. If the given input frame is to provide GOB 1 of the output frame, the picture header of the given frame is modified in block 214 to represent a CIF frame header. This can be accomplished by, for example, altering the fourth bit of a six-bit PTYPE field in the picture header from a "0" to a "1" to thereby indicate that the given frame is in a CIF format. The GOBs in each input frame are then identified as shown in operation block 216 by detecting corresponding GOB start codes (GBSCs). The group number (GN) of each GOB is then modified in accordance with a predetermined GN mapping of input group number $GN_i$ to output group number $GN_o$. TABLE 1 shows an exemplary GN mapping for the five-user embodiment described above in conjunction with FIG. 4.

TABLE 1

| QCIF 1 | | QCIF 2 | | QCIF 3 | | QCIF 4 | | QCIF 5 | |
|---|---|---|---|---|---|---|---|---|---|
| $GN_i$ | $GN_o$ | $GN_i$ | $GN_o$ | $GN_i$ | $GN_o$ | $GN_i$ | $GN_o$ | $GN_i$ | $GN_o$ |
| 1 | 1 | 1 | 2 | 1 | 6 | 1 | 7 | 1 | 10 |
| 3 | 3 | 3 | 4 | 3 | 8 | 3 | 9 | 3 | 12 |
| 5 | 5 | 5 | X | 5 | X | 5 | 11 | 5 | X |

It can be seen from TABLE 1 that the GNs for one or more GOBs from each user input QCIF frame are renumbered with the corresponding GOB number of the CIF output frame in accordance with the GN mapping to thereby provide the output frame configuration of FIG. 4. Any input QCIF GOBs which are not utilized in the CIF output frame are indicated by a $GN_o$ of X in TABLE 1. These unused GOBs are skipped by the coded-domain combiner in accordance with the predetermined GN mapping, as indicated in block 216. This skipping of unused input GOBs ensures that the same selected input GOBs inserted in the next CIF output frame will appear in same screen location when displayed.

Figure 1:
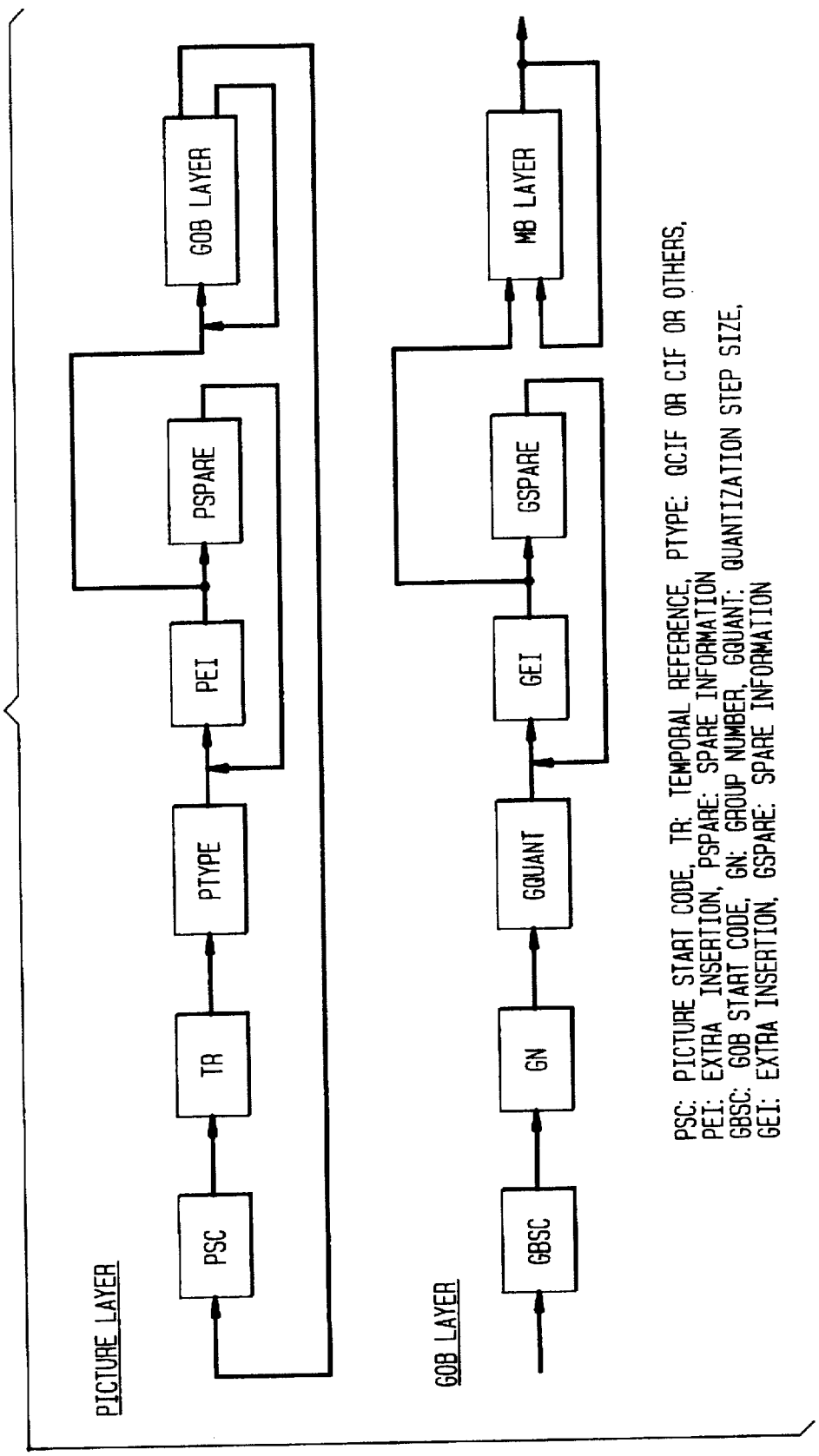
FIG. 1 is a syntax diagram of the top two layers of the CCITT H.261 video standard.

It should be noted that a particular input may exhibit one or more dropped frames arising from, for example, differences in temporal references between the different input video signal streams. The dropped frames will generally appear as gaps in the corresponding input stream, and therefore a selected input GOB with valid video data may not be available for placement in the output frame. In this event, operation block 220 indicates that the headers of output frame GOBs corresponding to dropped input frames are filled. The output GOB headers may be filled by, for example, inserting a GBSC and GN at the appropriate location in the header, in accordance with the syntax structure of FIG. 1. Operation block 224 then indicates that the GOBs having the same TR are combined into a CIF output frame such as frame 30 of FIG. 4 for output to each of the users. The steps shown in blocks 204–224 are repeated for each output CIF frame as long as the current video conferencing session is continuing as determined in decision block 228.

Figure 7:
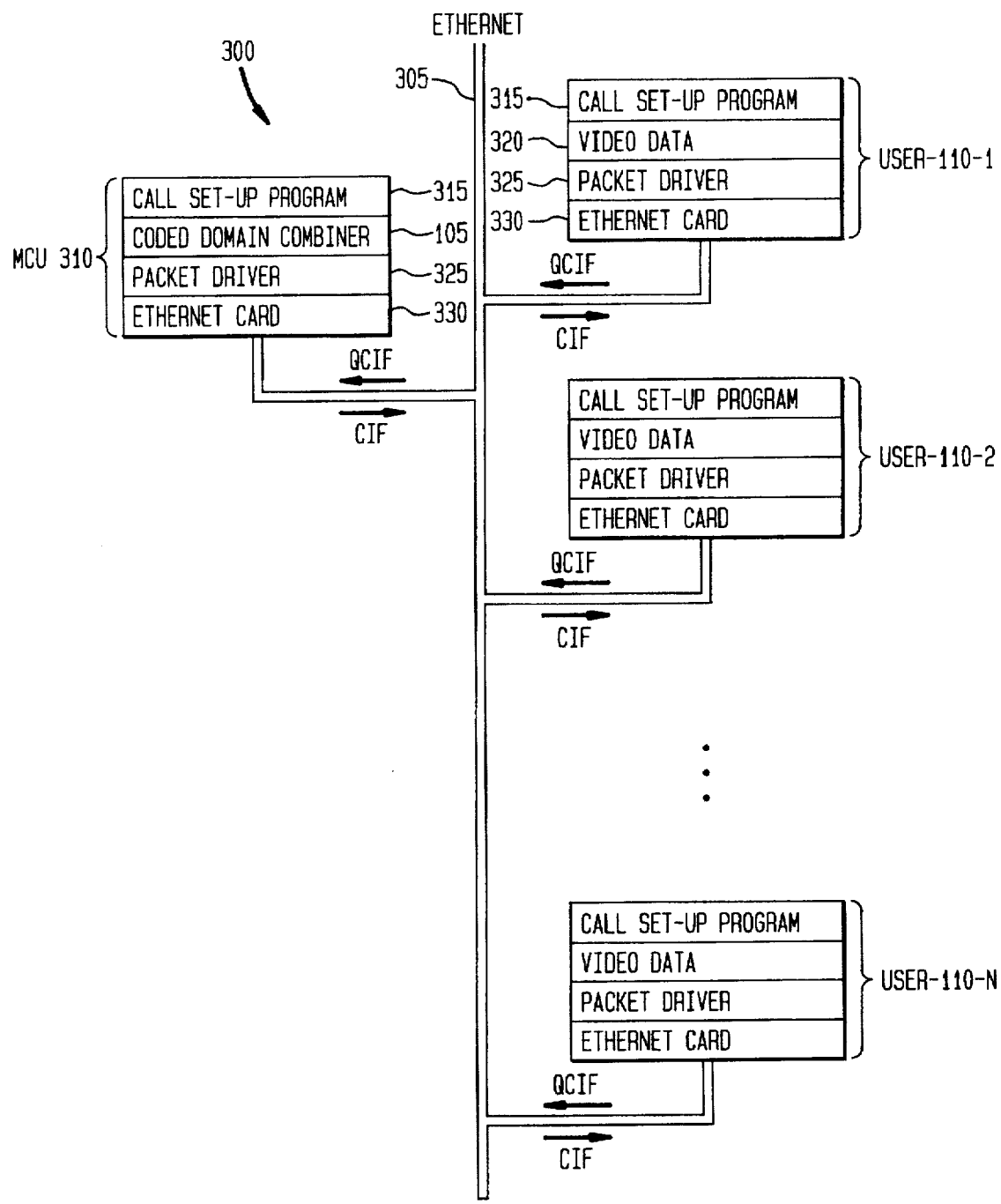
FIG. 7 is a block diagram of an exemplary implementation of the present invention in a computer network.

FIG. 7 shows an exemplary video conferencing system 300 in accordance with the present invention. The system 300 utilizes an Ethernet network 305 to provide transmission of video signals between users 110-i and a continuous presence multipoint control unit (MCU) 310. The system 300 is configured as a client/server system with MCU 310 operating as a server and users 110-i operating as clients. The users 110-i in this example represent personal computers and each include a call set-up program 315, a video data source 320 which is typically a codec, a packet driver 325 and an ethernet card 330. The MCU 310 is also a personal computer and includes call set-up program 315, coded-domain combiner 105 of FIG. 5, packet driver 325 and ethernet card 330. The packet drivers 325 and ethernet cards 330 enable communication between MCU 310 and users 110-i over Ethernet network 305 in a known manner. The call set-up program 315 identifies the number of conference users, provides a variety of user-selectable screen layouts and otherwise controls the video conference to enable transfer of video signals between users 110-i and MCU 310. The coded domain combiner 105 provides the buffering and multiplexing operations described above in conjunction with FIGS. 5 and 6, and as previously noted may be implemented using a suitably programmed microprocessor, ASIC, or other digital data processor. It should be recognized that the coded-domain combining of the present invention may be implemented using any number of alternative communication media, including ISDN, wireless personal communication systems, asynchronous transfer mode (ATM) networks, or standard wired telephone networks.

Figure 8:
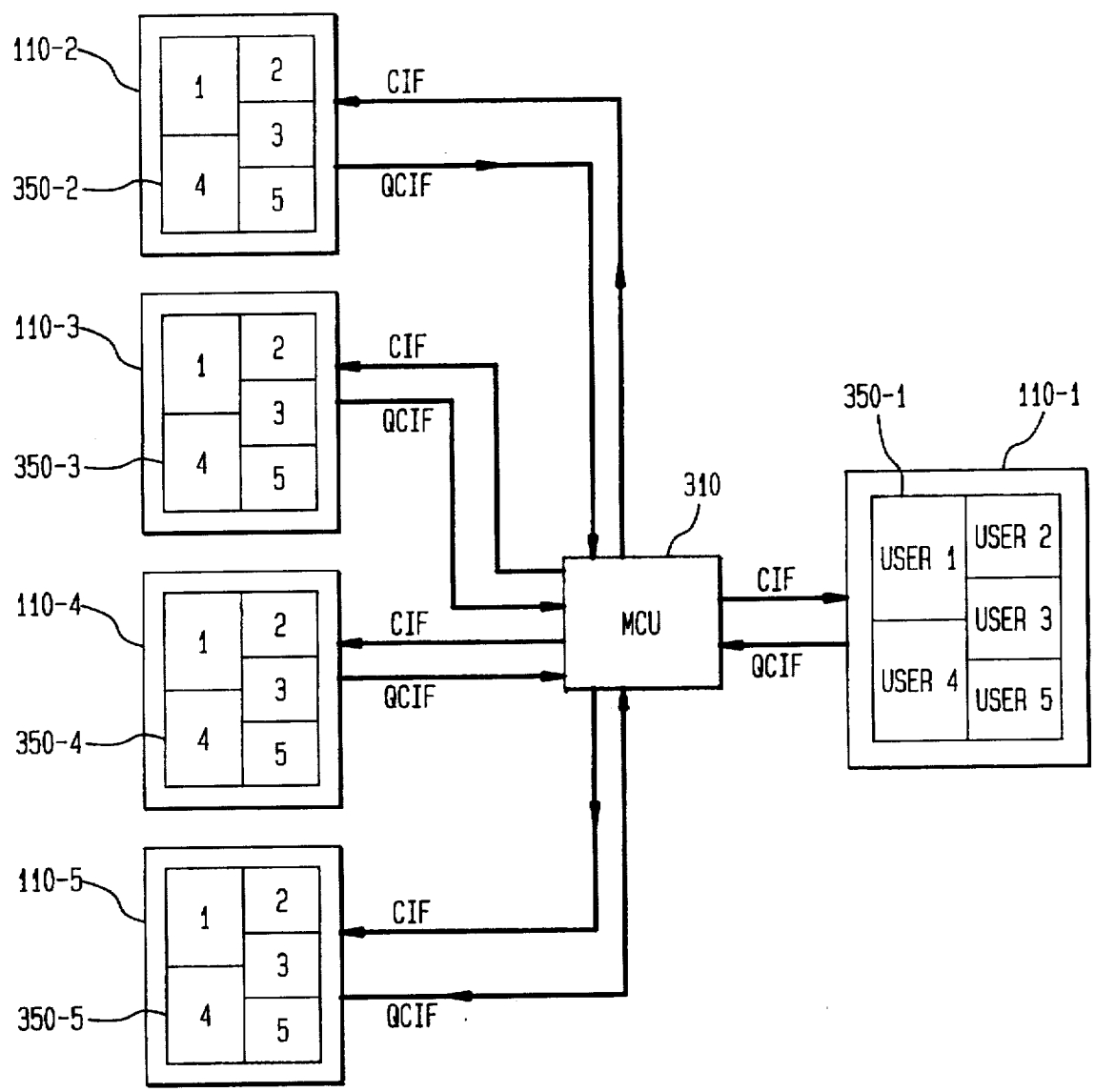
FIG. 8 illustrates a five-user divided-screen continuous presence video conference in accordance with the present invention.

FIG. 8 illustrates the generation of a five-user divided display in accordance with the present invention. The MCU 310 receives QCIF video input signals from users 110-i and supplies a composite CIF video output signal to each of the users 110-i in the manner previously described. The composite CIF video signal includes a plurality of output frames organized in the manner illustrated in FIG. 4. Thus, users 110-1 and 110-4 each contribute three GOBs to a given CIF output frame, while users 110-2, 110-3 and 110-5 each contribute two GOBs to a given CIF output frame. The composite signal is displayed on a divided-screen display 350-i within a user terminal corresponding to user 110-i. Each user thus views a composite display such as display 350-1 shown for user 110-1. The displays 350-i are divided in accordance with the output frame organization of FIG. 4. Each display includes a left half and a right half. The left half is divided betweens users 110-1 and 110-4 which each contribute all three of their QCIF input GOBs to the output CIF frame. The right half of the display is equally divided between users 110-2, 110-3 and 110-5 which each contribute two of their three GOBs to the output CIF frame. The displays 350-1, 350-2, 350-3, 350-4 and 350-5 are divided in the same manner in this embodiment such that each user views the same composite video signal. The present invention thus provides a flexible block-based video signal combining technique in which more than four users can be accommodated and in which certain users can be assigned a greater portion of the output display than others. Of course, other embodiments could utilize a wide variety of alternative screen display configurations. For example, twelve users could each contribute a single GOB per input QCIF frame to an output CIF frame, such that the resultant display 350-i is equally divided between the twelve users.

The above-described embodiments of the invention are intended to be illustrative only. Numerous alternative embodiments may be devised by those skilled in the art without departing from the scope of the following claims.

We claim:

1. A method of combining a plurality of video signals in a continuous presence video conferencing system, comprising the steps of:

receiving an input frame of a video signal from each of a plurality of system users, wherein each of the input frames includes a number of groups-of-blocks (GOBs); and forming an output frame including at least one of the GOBs from the input frame of each of the plurality of users and less than all of the GOBs from the input frame of at least one of said users.

2. The method of claim 1 wherein the step of forming an output frame further includes the step of incorporating all of the GOBs from the input frame of at least one of said users into the output frame.

3. The method of claim 1 wherein said plurality of users includes between five and twelve users of said system.

4. The method of claim 1 wherein the input frames are Quarter Common Intermediate Format (QCIF) frames each having three GOBs.

5. The method of claim 1 wherein the output frame is a Common Intermediate Format (CIF) frame having twelve GOBs.

6. The method of claim 4 wherein all three GOBs from the input frame of at least one of the users are incorporated into the output frame.

7. The method of claim 4 wherein two of the three GOBs from the input frame of at least one of the users are incorporated into the output frame.

8. The method of claim 1 wherein the input frames are QCIF frames each having three GOBs and the output frame is a CIF frame having twelve GOBs.

9. The method of claim 8 wherein said plurality of users includes at least five users of said system and further wherein all three GOBs from the QCIF frames of two of said users are incorporated the output CIF frame, and two of the three GOBs from the QCIF frames of each of the remaining three users are incorporated into the combined CIF frame.

10. The method of claim 8 wherein said plurality of users includes twelve users of said system and further wherein one GOB from each of said input frames is incorporated into the output CIF frame.

11. The method of claim 1 wherein the input frames are QCIF frames, the output frame is a CIF frame, and the step of forming an output frame further includes the step of incorporating at least two of the GOBs from the frame of each of the users into the combined CIF frame.

12. The method of claim 8 wherein the step of forming said output frame further includes the step of modifying a header of a given QCIF input frame if said given QCIF input frame is to be incorporated into said output frame as a first output GOB.

13. The method of claim 8 wherein the step of forming an output frame further includes the steps of:

identifying a picture start code and a temporal reference number in each of said QCIF input frames;

mapping the temporal reference number for each of said input frames onto a scale of temporal reference numbers having selected predetermined possible temporal reference numbers common to a plurality of said input frames;

detecting a GOB start code and group number for at least one of said GOBs of each of said input frames;

mapping the group numbers for at least one of said GOBs of each of said input frames to output frame group numbers; and incorporating the input frame GOBs into the output frame in accordance with the group number mapping.

14. The method of claim 13 wherein the step of incorporating the input frame GOBs further includes the step of filling output frame GOB headers corresponding to dropped input frames.

15. A coded-domain video signal combiner for use in a continuous presence video conferencing system, comprising:

a plurality of input buffers adapted to receive an input frame of a video signal from each of a corresponding plurality of system users, wherein each of the input frames includes a number of groups-of-blocks (GOBs); and a multiplexer coupled to said plurality of input buffers and operative to form an output frame including at least one of the GOBs from the input frame of each of the plurality of users and less than all of the GOBs from the input frame of at least one of said users.

16. The combiner of claim 15 wherein the input frames are Quarter Common Intermediate Format (QCIF) frames each having three GOBs and the output frame is a Common Intermediate Format (CIF) frame having twelve GOBs.

17. The combiner of claim 16 wherein said plurality of users includes at least five users of said system and further wherein said multiplexer incorporates all three GOBs from the QCIF frames of two of said users into the output CIF frame, and incorporates two of the three GOBs from the QCIF frames of each of the remaining three users into the output CIF frame.

18. The combiner of claim 16 wherein said multiplexer is operative to modify a header of a given QCIF input frame if said given QCIF input frame is to be incorporated into said output frame as a first output GOB.

19. The combiner of claim 16 wherein said multiplexer is operative to detect a GOB start code and group number for at least one of said GOBs of each of said input frames, to map the group numbers for at least one of said GOBs of each of said input frames to output frame group numbers, and to incorporate the input frame GOBs into the output frame in accordance with the group number mapping.

20. The combiner of claim 19 wherein the multiplexer is operative to fill output frame GOB headers corresponding to dropped input frames.

* * * * *